United States Patent [19]

Pitchford

[11] Patent Number: 4,932,839
[45] Date of Patent: Jun. 12, 1990

[54] PROPULSION AND STEERING APPARATUS

[76] Inventor: Arthur H. Pitchford, 2727 Highway 441 S.E., Okeechobee, Fla. 34974

[21] Appl. No.: 156,545

[22] Filed: Feb. 16, 1990

Related U.S. Application Data

[63] Continuation-in-part of Ser. No. 902,585, Sep. 2, 1986, abandoned.

[51] Int. Cl.$^5$ .......................... B63H 7/02; B60F 3/00
[52] U.S. Cl. .................. 416/246; 416/247 A; 440/37
[58] Field of Search ............... 416/246, 247 R, 247 A; 440/1, 37, 71, 72, 84, 85; 114/43; 403/93, 116, 117, 378

[56] References Cited

U.S. PATENT DOCUMENTS

| | | | |
|---|---|---|---|
| 1,443,368 | 1/1923 | Lamblin | 440/37 |
| 2,213,611 | 9/1940 | Ronning | 440/1 |
| 2,861,533 | 11/1958 | Thomas | 114/43 X |
| 2,987,281 | 6/1961 | Schurr et al. | 440/37 |
| 3,139,057 | 6/1964 | Black | 114/43 |
| 3,188,995 | 6/1965 | Barten | 440/37 X |
| 3,791,333 | 2/1974 | Losch | 440/37 X |
| 3,879,146 | 4/1975 | Mayer | 403/93 |
| 4,061,100 | 12/1977 | Muhlfeld | 114/43 |
| 4,322,208 | 3/1982 | Kelpin | 440/37 |
| 4,767,363 | 8/1988 | Uchida et al. | 440/1 |

FOREIGN PATENT DOCUMENTS 51-6974 1/1940 United Kingdom .................. 440/1

Primary Examiner—Everette A. Powell, Jr.
Attorney, Agent, or Firm—Rodgers & Rodgers

[57] ABSTRACT a propulsion and steering apparatus generally for a boat having a unitized construction comprising an engine, propeller, rudder and protective cage for the propeller, all mounted on a rotatable pylon adapted to be secured to the transom or other portions of the boat. A rudder is attached to the pylon and projects into the water to facilitate steering of the boat if the engine should die or be at idle speed. An ice break can be substituted for the rudder for use of the vehicle on snow and frozen water such as for ice fishing and rescue work. If desired, the apparatus can be mounted forwardly of the transom on transversely extending beams in the boat to provide a large open area that will be kept available for fishermen and equipment in the rear of the boat. The entire propulsion means is adaptable to be hinged to the mounting so it may be laid down to present a low profile for moving under bridges, storing in garages and while being transported on the highways.

10 Claims, 4 Drawing Sheets

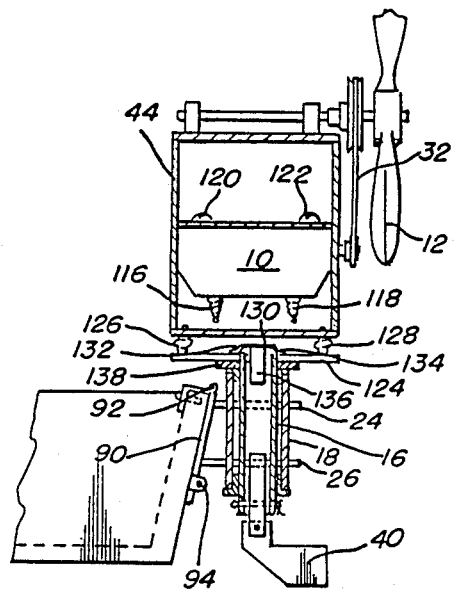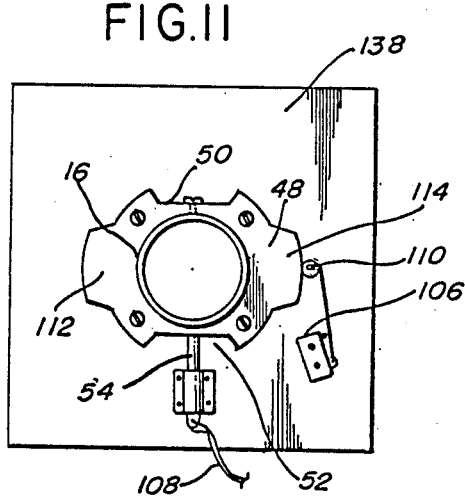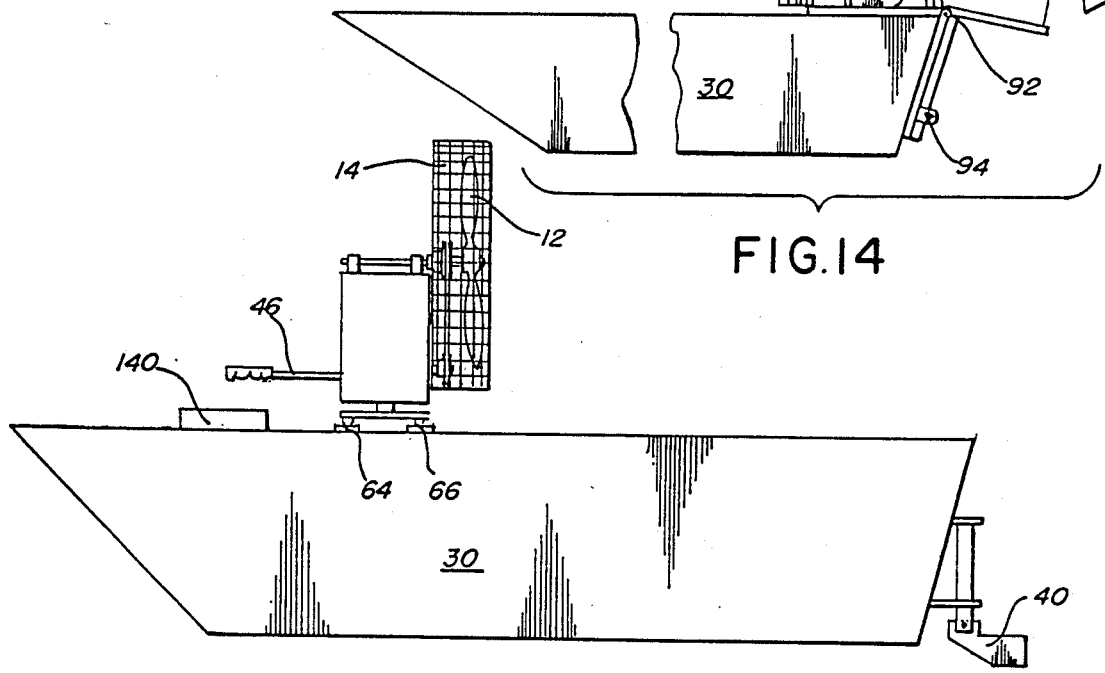

PROPULSION AND STEERING APPARATUS

This is a continuation in part of application Ser. No. 902,585 filed Sept. 2, 1986, now abandoned.

BACKGROUND OF THE INVENTION

Heretofore air boats have been relatively large, using high powered engines to provide sufficient power to drive boats at high speeds. The boat hulls are custom made to fit the drive systems and are heavy and expensive. Steering is affected by having the propeller blast hit a large rudder or rudders to deflect the air and steer the boat. When the engine dies while operating at high speed, or is stopped, as it must be when approaching a dock or other place to permit passengers to disembark, steering of the craft is lost, often resulting in a very hazardous condition. Most accidents involving air boats are caused by loss of directional control. Other air boats cannot stop the propeller when the engine is idling resulting in continuous movement of the boat.

FIELD OF THE INVENTION

The purpose of this invention is to provide a packaged air drive system that can be used interchangeably with the conventional outboard or inboard water drive units, with identical mounting to standard existing boats and at a substantially lower price. The assembly comprises an engine, propeller and protective shielding, all mounted on a pylon which, for example, may be secured to the transom of a boat, and on which a rudder may be attached at the bottom of the pylon to project into the water to provide steerability of the craft when the propeller stops turning to approach the dock or other mooring place or when the engine dies inadvertently when moving at a fast speed. The system steers the boat by changing the direction of thrust from the propeller when rotating the pylon on which the entire assembly is mounted. The assembly is extremely light as compared to other air propulsion systems and provides a low center of gravity for greater stability and safety from capsizing of the craft. It can be mounted to the transom or on transversely extending beams positioned forward in the boat to provide a large work area in the rear of the boat for net fishermen or others, making the air boat more adaptable as a work boat for shallow water or where aquatic growth hinders the use of water drive propellers. The engine to propeller drive assembly includes a fluid or a centrifugally operated clutch which releases the propeller when the engine is decelerated to idling speed. The engine is equipped with a spring loaded hand throttle that decelerates to idle speed when released. Disengaging the propeller when the engine is idling permits the boat to stop dead in the water. Other air boats do not have this ability and will start moving as soon as the engine is started and continue moving even with the engine idling. This feature is important to fishermen who wish to stop and start often and move slowly while casting.

DESCRIPTION OF THE PRIOR ART

Heretofore air boats have been heavy, high powered and expensive. As a result, their use has been seriously restricted. None appears to have been built for economically minded sportsmen and those who need a large clear working area at the rear of their boats. No air drive system has been designed as an add on to already owned boats. None of the existing air boats has the ability to stop the propeller while the engine is idling. None has a rudder in the water for automatic steering of the boat when the engine dies while the boat is underway, thereby eliminating a dangerous situation as waves can cause the boat to broach or slide sideways into an obstruction. Also none has the means to insure that the engine is stopped when the apparatus is rotated to reverse the direction of the boat. Additionally none has the means of tilting the entire propulsion system to a position close and horizontal to the gunnels of the boat to lower the system for moving under bridges, garage doors and while being transported over land.

SUMMARY OF THE INVENTION

The combination of a light weight portable assembly which can be attached to existing used boats, comprising a low center of gravity engine operably connected through a belt drive and fluid or centrifugal clutch to a propeller surrounded by a protective cage. The assembly is mounted on a rotatable pylon and supporting brackets for attachment to the transom or gunnels of a boat. A rudder is mounted on the bottom end of the pylon and extends into the water for automatic directional control of the boat upon the loss of engine power. The engine automatically shuts off when the apparatus is rotated to reverse the direction of movement of the boat.

BRIEF DESCRIPTION OF THE DRAWINGS

FIG. 11 is a bottom plan view of the automatic engine cut off feature.

FIG. 12 is a side elevational view of the apparatus with a portion thereof broken away.

FIG. 13 is a side elevational view similar to that shown in FIG. 6.

FIG. 14 is a side elevational view with the apparatus disposed in a generally horizontal position.

DESCRIPTION OF THE PREFERRED EMBODIMENTS

Figure 1:
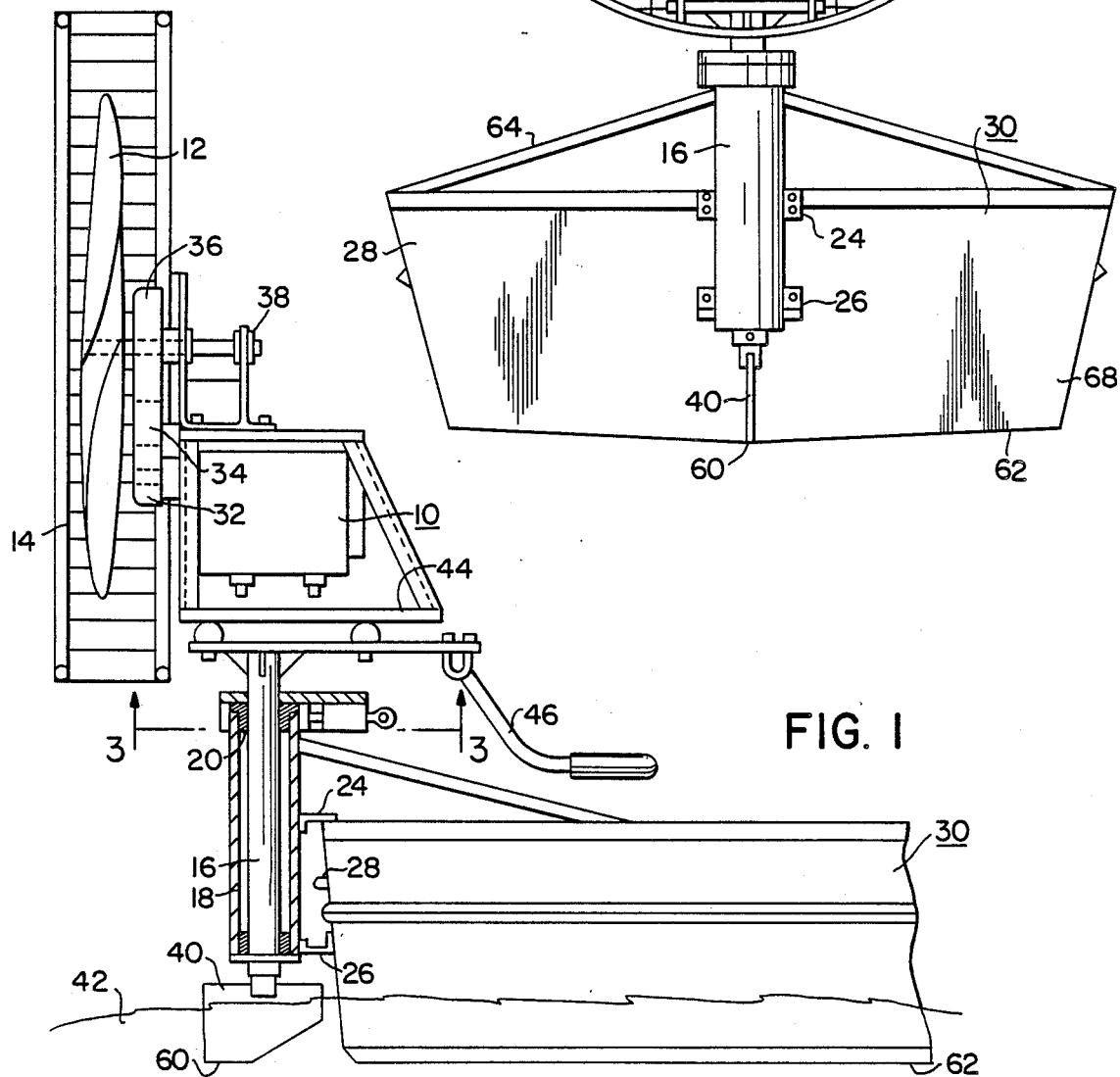
FIG. 1 is a side elevational view of the engine and propeller assembly mounted on the transom of a small boat according to this invention.

Referring to FIG. 1, the invention is illustrated as applied to an air boat assembly consisting of an engine 10 operably connected to drive a propeller 12 mounted in a protective shielding 14. The engine, propeller and shielding are mounted on pylon 16 journalled for angular steering movement in tube 18 have upper and lower bearings designated at 20. The tube 18 is mounted on upper bracket 24 and on lower bracket 26 for securing the air boat drive assembly to transom 28 of boat 30. It will be understood that, if desired, a clamp or bracket of the type employed to secure outboard motors to the transom of boats can be employed to secure the assembly to the transom 28. In addition, bracket 24 can be hingedly mounted on transom 28.

Figure 2:
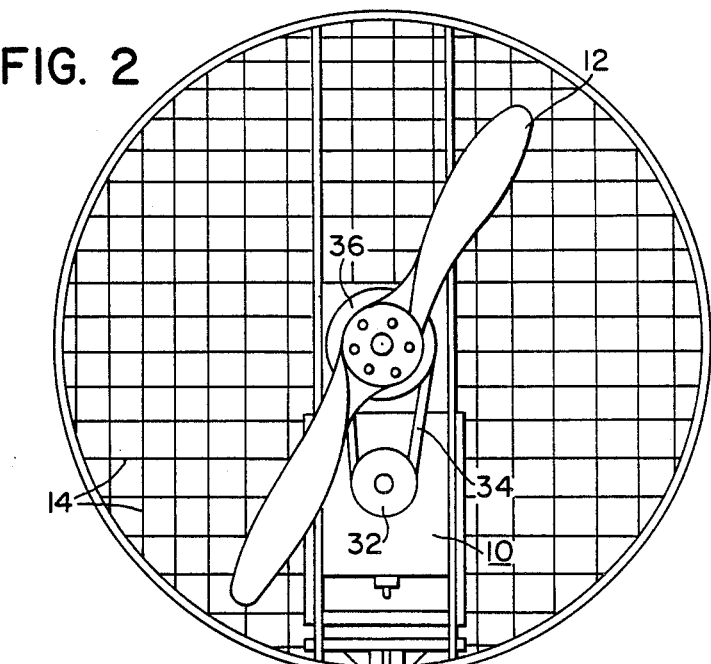
FIG. 2 is a rear elevational view thereof.

Referring to FIGS. 1 and 2 it will be noted that engine 10 is of the type wherein the crankshaft is positioned at the top with the spark plugs at the bottom and is fitted with a drive pulley 32 operably connected by belt 34 to a driven pulley and fluid or centrifugal clutch 36 secured to the hub of the propeller 12. It will be noted that the drive pulley 32 is much smaller in diameter than is pulley 36 which is a clutch and pulley whereby at idle speed of engine 10 propeller 12 is stopped. Note that the propeller is mounted on a jack shaft with flange bearings. It will be understood that belt 34 can be of the flat type or of the V-type and wherein several belts driven in tandem may be employed to effect the drive. Also it will be understood that a fluid or centrifugal clutch 36 may be provided between pulley 34 and propeller 12 to permit the engine to operate at a much higher speed of rotation than is efficient for the propeller to operate at idling. Also it will be understood that the engine may operate at a suitable idling speed, and that at idling speed, the drive of the propeller is interrupted so that the propeller does not rotate while the engine is idling.

Attention is directed to the fact that the lower end of pylon 16 is provided with rudder 40 projecting into water 42 to effect a steering action to control the direction of travel of the boat 30. A suitable framework 44 is interposed between engine 10 and pylon 16. The tiller 46 is operably connected to the framework 44 and is provided to steer boat 30. The use of rudder 40 is important in steering boat 30, particularly when engine 10 has been reduced to the idling speed and propeller 12 is, at that time, not rotating. Without the use of rudder 40, control of the direction of travel of boat 30 is dependent on the use of paddles or poles in an attempt to control the direction of the boat when the speed of the engine 10 has been reduced to the idling speed and propeller 12 is not rotating.

Figure 3:
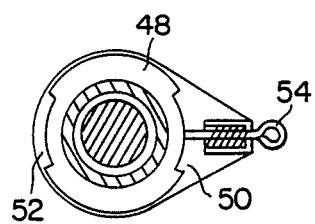
FIG. 3 is a sectional plan view taken along the line 3—3 in FIG. 1.

As shown in FIG. 3, ring 48 having oppositely spaced cutout segments 50 and 52 is secured to rotatable pylon 16, and spring loaded plunger 54 projects into the cut out segments to restrict the steering rotation of the assembly comprising the engine, propeller and protective shielding by actuation of the tiller 46 to, in the illustration shown, approximately 30 degrees on each side of the neutral line to prevent oversteering. To permit a greater than 60 degree movement of the assembly by the tiller, the spring loaded plunger 54 must be withdrawn to permit ring 48 to rotate to a greater degree than is permitted by cut out segments 50 and 52. The segment 50 for example controls the direction of the boat 30 in the forward direction, and cut out segment 52 provides the control when the assembly is reversed so that the propeller 12 drives the boat 30 in the reverse direction.

Figure 4:
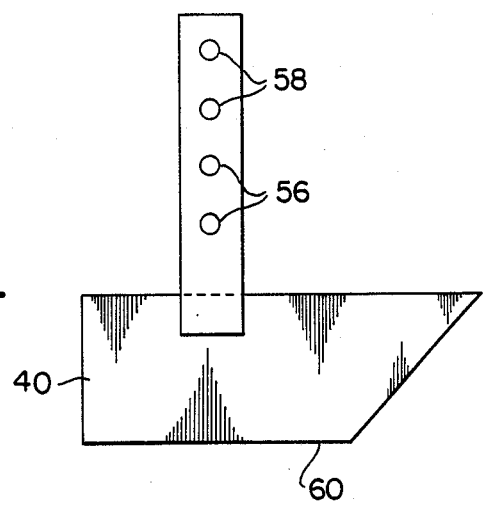
FIG. 4 is a side elevational view of the rudder assembly.

As shown in FIG. 4, rudder 40 has an upstanding bar 56 and a plurality of spaced apertures 58 formed therein by which rudder 40 can be secured in the rotatable pylon 16 at varying elevations. Bottom 60 of rudder 40 can thus be controlled to extend below bottom 62 of the boat 30. It will be noted that the forward edge of the rudder is angled so as to permit the front edge of the rudder to be positioned above the surface of the water so as to easily override any seaweed or other water plants and to prevent the rudder from becoming fowled.

Figure 5:
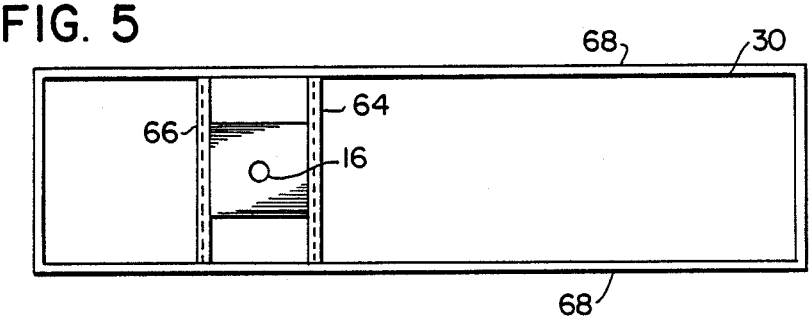
FIGS. 5 and 6 are top plan and side elevational views, respectively, of spaced gunnels to shift the engine and propeller assembly forwardly of the transom.
Figure 6:
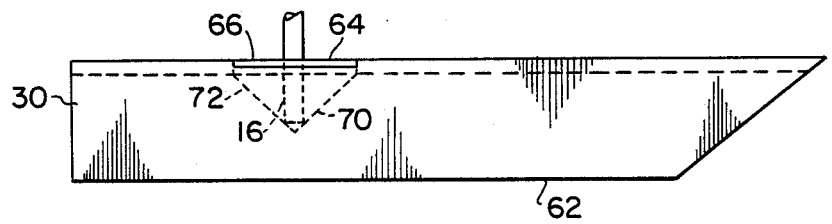

Referring to FIGS. 5 and 6, the propeller drive assembly mounted on the pylon 16 can be shifted forwardly in boat 30 to provide a work area behind propeller 12 for the convenience of fishermen and others who need space to work in the rear of the boat. A pair of spaced transverse beams 64 and 66 are secured to gunnels 68 of boat 30. As shown in FIG. 6, pylon 16 projects down into the boat and spaced braces 70 and 72 secured to beams 64 and 66, respectively, securely hold pylon 16 in the vertical position.

When the engine is driving the propeller, the assembly comprising the engine and propeller mounted on the pylon can be oscillated by operation of the tiller 46 to effect the desired steering of the boat.

Figure 7:
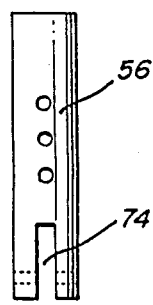
FIGS. 7, 8 and 9 are side elevational views of a modified rudder assembly.
Figure 8:
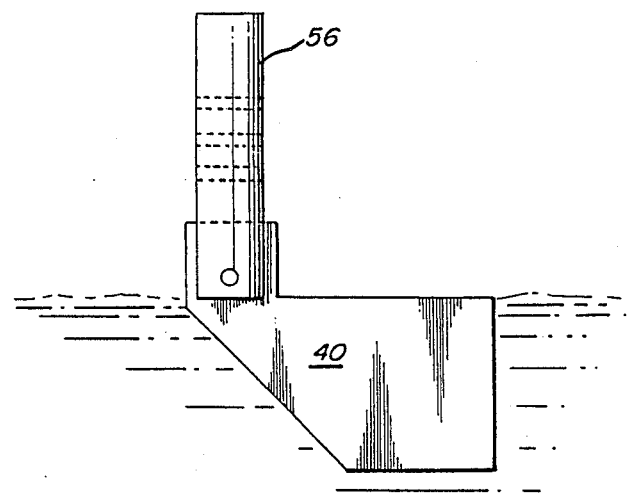
Figure 9:
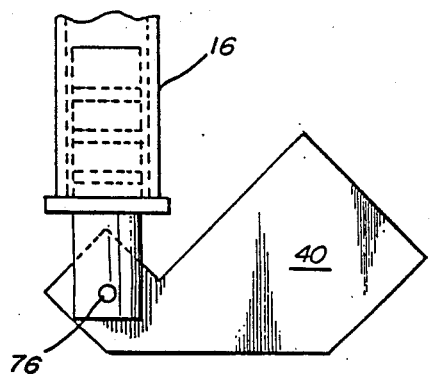

The rudder apparatus as shown in FIGS. 7, 8 and 9 includes rudder 40 which is pivotally mounted in slot 74 of upstanding bar 56. More specifically, rudder 40 pivots about pin 76. Therefore, as boat 30 traverses shallow water and comes into contact with weeds, rocks and the like disposed under the surface of the water, rudder 40 will simply pop up or rotate in a counterclockwise direction, as shown in FIGS. 8 and 9, and simply slide over the interfering debris. After boat 30 has passed the debris, the inherent weight or spring loading of rudder 40 simply causes it to rotate in a clockwise direction into the operating position as shown in FIG. 8.

Figure 10:
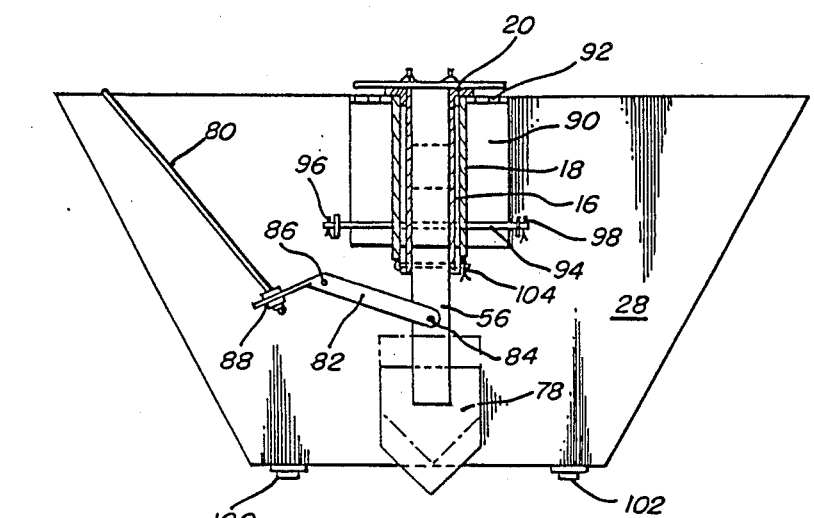
FIG. 10 is an elevational view from the rear of the boat showing the ice brake feature of this invention with a portion of the assembly broken away.

A modified feature of the invention is shown in FIG. 10 wherein rudder 40 is essentially replaced with ice brake 78 which is of a planar configuration and is slidably mounted in pylon 16. When it is desired to lower or raise ice brake 78, rod 80 is either pushed or pulled, as appropriate, which imparts the desired vertical movement of ice brake 78 through lever 82 which is pivotally connected to upstanding bar 56 at pivot 84 and to transom 28 at pivot 86. Rod 80 is connected to lever 82 by means of bolt assembly 88.

According to another feature of this invention, and as shown in FIG. 10, the entire apparatus is secured to mounting plate 90 which is connected along the upper edge of transom 28 by means of hinge 92. Therefore, the entire assembly including propeller 12 and protective shielding 14 as well as pylon 16 and the associated rudder 40 or ice brake 78 can simply be swung inwardly of the boat into generally a horizontal position as shown in FIG. 14. By this means, the boat can be maneuvered easily under low bridges, into garages and the like. In the vertical or operating position, the apparatus is locked into position by means of locking bar 94 which is secured to transom 28 by means of locking assemblies 96 and 98. Finally, in cold weather operation, a pair of ice runners or skis 100 and 102 are fitted to the underside of boat 30.

Therefore, in actual operation such as on a frozen lake, boat 30 is propelled by means of propeller 12. In this condition, ice brake 78 is in the upward condition as shown in dotted lines in FIG. 10. Of course, whenever it is desired to slow or stop boat 30, rod 80 is pulled upwardly, which action, through lever 82, causes ice brake 78 to be lowered to the position shown by means of solid lines in FIG. 10. The V-shaped configuration of ice brake 78 and the fact that it is disposed perpendicular to the direction of travel of boat 30 allows it to easily impact the ice in a frictional manner. The more ice brake 78 is lowered, the greater the braking action that will occur. When not in use, ice brake 78 can be locked in a raised position by means of pin arrangement 104 in cooperation with apertures 58 of locking bar 56.

As discussed above, generally in connection with FIG. 3, in order to reverse direction of boat 30, the entire apparatus is simply rotated 180 degrees by manipulation of spring loaded plunger 54 and cutout segments 50 and 52. As shown in FIG. 11, a safety mechanism in the form of switch 106 is supplied. Therefore, when it is desired to rotate the entire apparatus, plunger 54 is withdrawn by means of lanyard 108 a distance sufficient to allow rotation of ring 48. As ring 48 is rotated, cam follower 110 of switch 106 enters the appropriate cutout segment 50 or 52 causing engine 10 to be stopped through the action of switch 106. As the rotation of ring 48 continues, cam follower 110 reaches either protruding portion 112 or 114 of ring 48. This in turn activates switch 106 thereby allowing engine 10 to be restarted and plunger 54 generally simultaneously enters corresponding cutout segment 50 or 52.

Therefore, it can be seen that, in the normal operation of the assembly shown in FIG. 11, boat 30 can be steered generally through an arc of approximately 30 degrees which equates to the transverse distance of travel of plunger 54 in cutout segments 50 and 52. When plunger 54 is withdrawn and the apparatus is rotated, switch 106 acts to stop engine 10 when the propeller is directed generally perpendicular to the direction of travel thereby eliminating the possibility that the engine might be started when the propeller thrust is more toward one side of the boat which might cause it to capsize.

With reference to FIG. 12, engine 10 is mounted in an inverted position wherein spark plugs 116 and 118 extend downwardly and wherein engine 10 is mounted to framework 44 by means of bolts 120 and 122. In order to absorb the vibration of engine 10, framework 44 is mounted on mounting plate 124 by means of rubber mounts 126 and 128. The engine is mounted in this configuration to keep the major weight low relative to the boat for a low center of gravity and a short drive belt length. Also, as best shown in FIG. 12, mounting plate 124 is spaced vertically upward from the upper edge of transom 28 to allow sufficient clearance for the apparatus to rotate on hinge 92 into a generally horizontal position.

In order to prevent pylon 16 from sliding upwardly a distance greater than that desired, safety cap 130 is secured to mounting plate 124 by means of bolts 132 and 134. In order to provide necessary stabilization, portion 136 of safety cap 130 extends downwardly into pylon 16. Also shown in FIG. 12 is housing 138 of the safety mechanism shown in detail in FIG. 11.

FIG. 13 is similar to FIG. 6 in that engine 10 and propeller 12 along with associated apparatus are mounted intermediate the bow and stern of boat 30 on gunnels 64 and 66 and adjacent seat 140. In this configuration, fixed or pivotal rudder 40 or ice brake 78 are operated independently of the apparatus propulsion system in the form of propeller 12 and associated apparatus elements.

Therefore, by the apparatus according to this invention, propulsion means is provided which is adaptable to existing boats or other similar vehicles. At the same time, the apparatus is easy to use and extremely safe to operate.

I claim:

1. Propulsion and steering apparatus for a boat or a similar vehicle having a transversely extending transom and comprising an engine, a propeller operably interconnected with said engine, a protective shielding substantially enveloping said propeller, a vertically disposed pylon secured to said transom, said plyon supporting said engine and said propeller, means to angularly shift said plyon to redirect the thrust of said propeller, means to automatically stop said engine when said pylon is rotated beyond a predetermined degree, a rudder secured to said pylon and extending downwardly therefrom, said engine, propeller and pylon being hingedly interconnected to said transom adjacent the upper edge thereof, a mounting plate interposed between said pylon and said engine, said mounting plate being spaced vertically upward from a horizontal plate intersecting the upper edge of said transom a distance sufficient to allow said propeller to swing through an arc of approximately 90 degrees into a substantially horizontal position overlying said boat.

2. Apparatus according to claim 1 wherein said means to automatically stop said engine comprises a ring interconnected to said pylon and a cam follower and witch assembly adapted to cooperate with said ring, said ring comprising diametrically oppositely disposed cutout segments whereby when said cam follower enters said cutout segments said engine is deactivated.

3. Apparatus according to claim 1 wherein a safety cap is secured to the upper surface of said mounting plate in coaxial relation to said pylon.

4. Apparatus according to claim 1 wherein said rudder is vertically adjustable.

5. Apparatus according to claim 1 wherein an ice brake is secured to said pylon and extends downwardly therefrom.

6. Apparatus according to claim 5 wherein said ice brake is substantially planar in configuration and is disposed substantially perpendicular to the direction of travel of said boat.

7. Apparatus according to claim 1 wherein said rudder is pivotally interconnected to said pylon.

8. Apparatus according to claim 1 wherein said boat comprises a pair of spaced gunnels, a bow and a stern and wherein a pair of spaced beams, extend between said gunnels intermediate said bow and said stern and wherein said engine and said propeller are interconnected to said gunnels.

9. Apparatus according to claim 1 wherein said engine comprises at least one spark plug, a belt and a crankshaft and wherein said crankshaft is disposed vertically above said spark plug to permit maximum weight to be disposed low relative to the boat and to allow a shorter belt length between said engine and said propeller.

10. Apparatus according to claim 1 wherein a fluid clutch is used to permit said propeller to stop turning when said engine speed is reduced to idling speed.

* * * * *